(12) United States Patent
Cheng

(10) Patent No.: US 7,930,045 B2
(45) Date of Patent: Apr. 19, 2011

(54) TWO-STAGE MODEL PREDICTIVE CONTROL TECHNIQUE

(75) Inventor: Xu Cheng, Pittsburgh, PA (US)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 373 days.

(21) Appl. No.: 12/247,132

(22) Filed: Oct. 7, 2008

(65) Prior Publication Data

US 2010/0087933 A1 Apr. 8, 2010

(51) Int. Cl.
*G05B 13/02* (2006.01)

(52) U.S. Cl. ............... 700/45; 700/28; 700/29; 700/30; 700/44; 700/53

(58) Field of Classification Search .............. 700/28–30, 700/44–45, 53
See application file for complete search history.

(56) References Cited

U.S. PATENT DOCUMENTS

| | | | |
|---|---|---|---|
| 4,349,869 A | 9/1982 | Prett et al. | |
| 4,616,308 A | 10/1986 | Morshedi et al. | |
| 5,561,599 A * | 10/1996 | Lu ................................... | 700/44 |
| 6,577,908 B1 * | 6/2003 | Wojsznis et al. ................ | 700/42 |
| 7,113,834 B2 * | 9/2006 | Wojsznis et al. ................ | 700/33 |
| 7,272,454 B2 * | 9/2007 | Wojsznis et al. ................ | 700/29 |
| 7,337,022 B2 * | 2/2008 | Wojsznis et al. ................ | 700/36 |
| 7,451,004 B2 * | 11/2008 | Thiele et al. ..................... | 700/28 |
| 2003/0195641 A1* | 10/2003 | Wojsznis et al. ................ | 700/42 |
| 2007/0078529 A1* | 4/2007 | Thiele et al. ..................... | 700/29 |
| 2007/0168057 A1* | 7/2007 | Blevins et al. ................... | 700/53 |
| 2009/0112335 A1* | 4/2009 | Mehta et al. ..................... | 700/29 |

FOREIGN PATENT DOCUMENTS

| | | |
|---|---|---|
| GB | 2 446 343 | 8/2008 |
| WO | WO-96/27824 | 9/1996 |

OTHER PUBLICATIONS

Qin et al., "An Overview of Industrial Model Predictive Control Technology," *AIChE Conference*, pp. 232-256 (1996).
Great Britain Search Report for Application No. GB0915643.1, dated Jan. 15, 2010.

* cited by examiner

*Primary Examiner* — Ramesh B Patel
(74) *Attorney, Agent, or Firm* — Marshall, Gerstein & Borun LLP

(57) ABSTRACT

A two-stage model predictive control (MPC) controller uses a process model and two separate MPC control modules, including a feedforward MPC control module and a feedback MPC control module, to determine a set of control signals for use in controlling a process. The feedforward MPC control module uses the process model to determine a feedforward control component for each of a set of control signals and the feedback MPC control module uses the process model and one or more measured process outputs to determine a feedback control component for each of the set of control signals. The two-stage MPC controller combines the feedforward control components with the feedback control components to form the final control signals used to control the process. The two different control modules may receive separate and different inputs from the process to determine the feedforward control components and the feedback control components, and may be tuned separately, to thereby enable a control operator or other user to perform more standardized and stabilized tuning within an MPC controller environment.

45 Claims, 9 Drawing Sheets

TWO-STAGE MODEL PREDICTIVE CONTROL TECHNIQUE

FIELD OF TECHNOLOGY

This patent relates generally to process plant control systems and, more particularly, to a method and apparatus for implementing a two-stage model predictive control technique within a process or plant environment.

DESCRIPTION OF THE RELATED ART

Process control systems, such as distributed or scalable process control systems like those used in power generation, chemical, petroleum, or other processes, typically include one or more controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process or plant such as opening or closing valves, switching devices on and off and measuring process parameters. The controller receives signals indicative of process or plant measurements made by the field devices and/or other information pertaining to the field devices, uses this information to implement a control routine and then generates control signals which are sent over the buses to the field devices to control the operation of the process or plant. Information from the field devices and the controller is typically made available to one or more applications executed by the operator workstation to enable an operator to perform any desired function with respect to the process or plant, such as viewing the current state of the plant, modifying the operation of the plant, etc.

Process or plant controllers are typically programmed to execute different algorithms, sub-routines or control loops (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or PI control function block, and a single output block, such as an analog output (AO) function block. These control loops typically perform single-input/single-output control because the control block creates a single control output based on a single measure process parameter, and uses the control output to control a single process input, such as a valve position, etc. However, in certain cases, the use of a number of independently operating, single-input/single-output control loops is not very effective because the process variables being controlled are affected by more than a single process input and, in fact, each process input may affect the state of many process outputs. An example of this situation might occur in, for example, a process having a tank being filled by two input lines, and being emptied by a single output line, each line being controlled by a different valve, and in which the temperature, pressure and throughput of the tank are being controlled to be at or near desired values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which, for example, causes the pressure loop to open the outlet valve to decrease the pressure. This action may then cause the throughput control loop to close one of the input valves, thereby affecting the temperature and causing the temperature control loop to take some other action. As will be understood in this example, the single-input/single-output control loops cause the process outputs (in this case, throughput, temperature and pressure) to behave in an unacceptable manner wherein the outputs oscillate without ever reaching a steady state condition or only after an unacceptable amount of time.

Model predictive control (MPC) or other types of advanced control have been used to perform process control in situations in which changes to a particular controlled process variable affect multiple process variables or outputs. Since the late 1970s, many successful implementations of model predictive control have been reported and MPC has become the primary form of advanced multivariable control in the process industry. Still further, MPC has been implemented within distributed control systems as distributed control system layered software.

Generally speaking, MPC is a multiple-input/multiple output control strategy in which the effects of changing each of a number of process inputs on each of a number of process outputs is measured and these measured responses are then used to create a control matrix or a model of the process. The process model or control matrix (which generally defines the steady state operation of the process) is inverted mathematically and is then used in or as part of a multiple-input/multiple-output controller to control the process outputs based on changes made to the process inputs. In some cases, the process model is represented as a process output response curve (typically a step response curve) for each of the process inputs and these curves may be created based on a series of, for example, pseudo-random step changes delivered to each of the process inputs. These response curves can be used to model the process in known manners. However, MPC techniques can use other types of process models, such as parameterized and first order process models. MPC is known in the art and, as a result, the details thereof will not be described herein. However, MPC is described generally in Qin, S. Joe and Thomas A. Badgwell, "An Overview of Industrial Model Predictive Control Technology," *AIChE Conference*, 1996. In addition, U.S. Pat. Nos. 4,616,308, 4,349,869 and 7,337,022 generally describe MPC controllers that can be used within process control systems.

Generally speaking however, during operation, many MPC controllers use a linear programming technique or a quadratic programming technique, to determine an optimal set of control signals for use in controlling the process over a particular period of time in the future to drive the process to a desired operating point. Basically, the MPC controller uses an optimizing function (typically referred to as an objective function) during each execution period of the MPC controller to define an optimal set of control signals (over a control horizon) to drive the process to the desired operating point, which may be defined by a set of process variable set points. A typical and well known MPC objective function determines a set of control signal moves (or changes) which, if applied over a specific period time in the future (i.e., the control horizon) produces the minimal amount of error between a set of measured process outputs or variables (referred to as controlled variables) and their respective desired values (e.g., the set points for the controlled variables), and minimizes movement in the control signals, while keeping the control signals, the controlled variables and other process variables within predefined constraints. The constraints may be user defined or may be associated with physical limitations that exist within the process plant. In many cases, the error between the measured controlled variables and the set points for the controlled variables may be determined as a sum of the squared errors between each of the measured controlled variables and a set point vector (defining set points for the controlled variables) over the prediction horizon. Moreover, movement in the control signal may be minimized by applying a penalty on move for each unit change of a particular control signal during the control horizon. Of course, other objective functions could be used instead of or in addition to this type of objective function.

When using current MPC techniques, the MPC objective function is defined to simultaneously account for and minimize errors developed between the measured controlled variables and their associated set points as well as to control the process in response to changes in other process variables, typically called disturbance variables (which may include changes in one or more controlled variable set points). This first function is generally associated with feedback control, while the later function is generally associated with feedforward control. However, because of the manner in which the MPC technique operates simultaneously on multiple variables to perform, in essence, both feedforward and feedback control, it is difficult for engineers and operators, who are accustomed to implementing traditional feedforward/feedback process control techniques (like proportional, integral and derivative control) to tune MPC controllers appropriately. Moreover, control operators are generally most familiar with, and are most comfortable with designing and tuning process controllers by separately tuning a feedfoward control component and a feedback control component to obtain the desired combination of control characteristics, i.e., to obtain a desired or acceptable combination of response time, overshoot and oscillation performance in the controlled variable responses. For example, feedfoward control is usually implemented to provide a coarse control signal and feedback control is used to tune or trim the coarse control signal to provide more exact control characteristics. However, an MPC controller is typically only capable of being tuned by making chances to the objective function, which makes it difficult if not impossible, using current techniques, to tune an MPC controller separately with respect to feedforward control characteristics and feedback control characteristics.

SUMMARY OF THE DISCLOSURE

A two-stage model predictive control (MPC) controller uses a process model and two separate MPC control modules, including a feedfoward MPC control module and a feedback MPC control module, to determine a set of control signals for use in controlling a process. The feedforward MPC control module uses the process model to determine a feedforward control component for each of a set of control signals and the feedback MPC control module uses the process model and one or more measured process outputs to determine a feedback control component for each of the set of control signals. The two-stage MPC controller then combines the feedforward control component with the feedback control component to form the final control signals used to control the process. The two different control modules may receive separate and different inputs from the process to determine the feedforward control components and the feedback control components, and may be tuned separately, to thereby enable a control operator or other user to perform more standardized and stabilized tuning within an MPC controller environment.

DESCRIPTION

Figure 1:
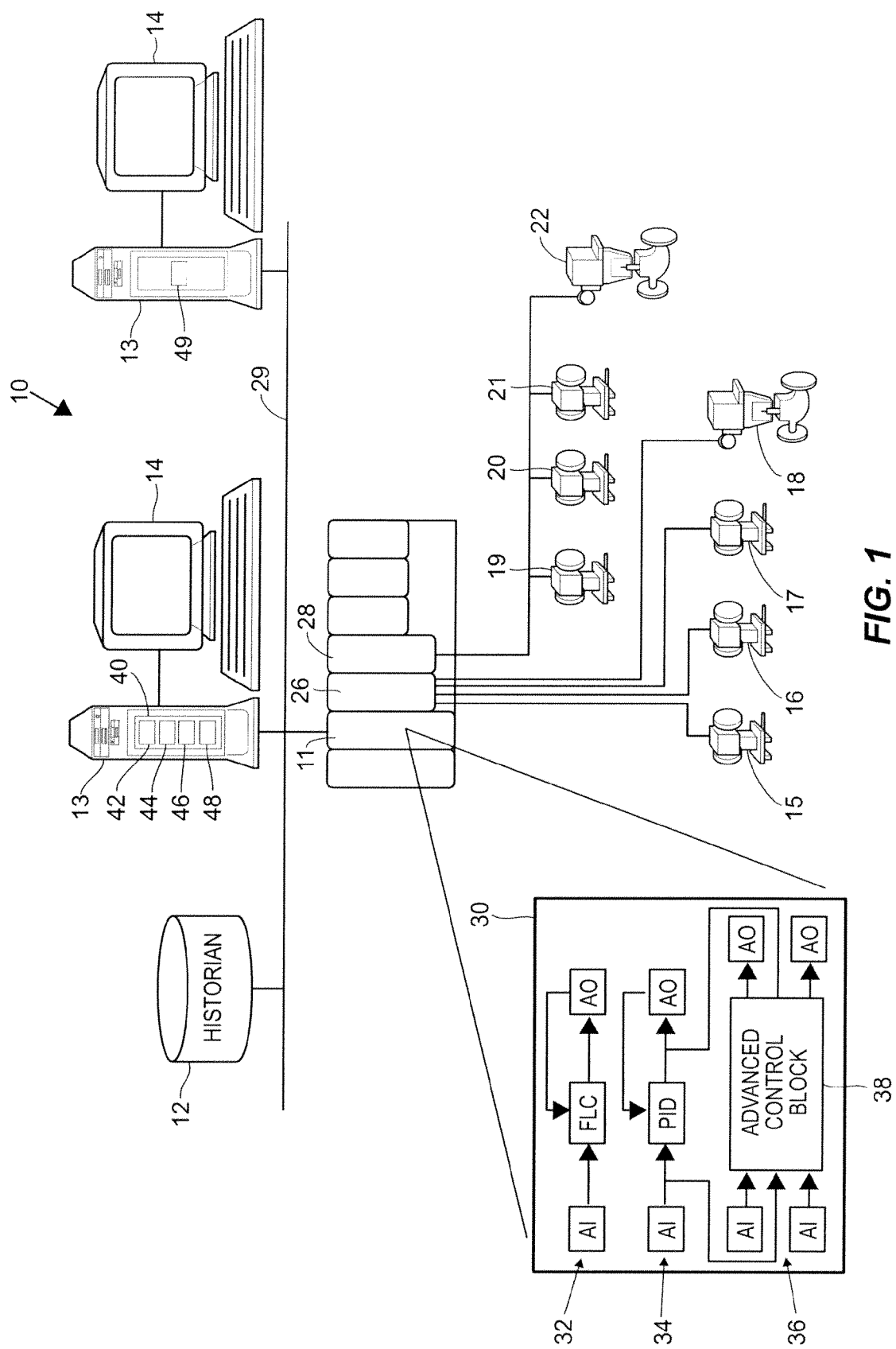
FIG. 1 is a block diagram of a process control system including a control module having an advanced controller function block that implements a two-stage MPC technique.

Referring now to FIG. 1, a process control system 10, which may be implemented in, for example, a power generation plant, a refinery or any other type of manufacturing or processing plant, includes a process controller 11 communicatively connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example, the Ovation™ controller sold by Emerson Process Management Power and Water Solutions, Inc. or the DeltaV™ controller sold by Emerson Process Management is communicatively connected to the host computers 13 and the data historian 12 via, for example, an Ethernet connection or any other desired communication network 29. The communication network 29 may be in the form of a local area network (LAN), a wide area network (WAN), a telecommunications network, etc. and may be implemented using hardwired or wireless technology or a combination of both. The controller 11 is communicatively connected to the field devices 15-22 using any desired hardware and software associated with, for example, standard 4-20 ma devices and/or any smart communication protocol such as the FOUNDATION® Fieldbus protocol (Fieldbus), the HART™ protocol, etc. Again, these communications may be implemented using hardwired or wireless communication technologies.

The field devices 15-22 may be any types of devices, such as sensors, valves, transmitters, positioners, turbines, etc. while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26 while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols developed in the future.

The controller 11, which may be one of many distributed controllers within the plant 10 and which includes at least one processor therein, implements or oversees one or more process control routines, which may include control loops, stored therein or otherwise associated therewith. The controller 11 also communicates with the devices 15-22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software, hardware, or firmware programming or design tools. Thus, the controller 11 may be configured to implement a control strategy or control routine in any desired manner.

In one embodiment, the controller 11 implements a control strategy using what are commonly referred to as function blocks, wherein each function block is a part or object of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, MPC, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which may be the case with Fieldbus devices. While the description of the control system is provided herein using a function block control strategy which uses an object oriented programming paradigm, the control strategy or control loops or modules could also be implemented or designed using other conventions, such as ladder logic, sequential function charts, etc. or using any other desired programming language or paradigm.

As illustrated by the expanded block 30 of FIG. 1, the controller 11 may include a number of single-loop control routines, illustrated as routines 32 and 34, and may implement one or more advanced control loops, illustrated as control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to numerous AI function blocks and outputs communicatively connected to numerous AO function blocks, although the inputs and outputs of the advanced control block 38 may be communicatively connected to any other desired function blocks or control elements to receive other types of inputs and to provide other types of control outputs. As will be described further, the advanced control block 38 may be a control block that uses a two-stage model predictive control technique. It will be understood that the function blocks illustrated in FIG. 1, including the advanced control block 38, can be executed by the controller 11 or, alternatively, can be located in and executed by any other processing device, such as one of the workstations 13 or even one of the field devices 19-22.

As illustrated in FIG. 1, one of the workstations 13 includes an advanced control block generation routine 40 that is used to create, download and implement the advanced control block 38. While the advanced control block generation routine 40 may be stored in a memory within the workstation 13 and executed by a processor therein, this routine (or any part thereof) may additionally or alternatively be stored in and executed by any other device within the process control system 10, if so desired. Generally speaking, the advanced control block generation routine 40 includes a control block creation routine 42 that creates an advanced control block and that connects this advanced control block into the process control system, a process modeling routine 44 that creates a process model for the process or a portion thereof based on data collected by the advanced control block, and a control logic parameter creation routine 46 that creates control logic parameters for the advanced control block from the process model and that stores or downloads these control logic parameters in the advanced control block for use in controlling the process. An optimizer routine 48 may be used to create an optimizer for use with the advanced control block 38. It will be understood the routines 42, 44, 46 and 48 can be made up of a series of different routines, such as a first routine that creates an advanced control element having control inputs adapted to receive process outputs and having control outputs adapted to provide control signals to process inputs, a second routine that enables a user to download and communicatively connect the advanced control element within the process control routine (which may be any desired configuration routine), a third routine that uses the advanced control element to provide excitation waveforms to each of the process inputs, a fourth routine that uses the advanced control element to collect data reflecting the response of each of the process outputs to the excitation waveforms, a fifth routine that selects or enables a user to select a set of inputs for the advanced control block, a sixth routine that creates a process model, a seventh routine that develops advanced control logic parameters from the process model, an eighth routine that places the advanced control logic and, if needed, the process model within the advanced control element to enable the advanced control element to control the process and a ninth routine that selects or enables a user to select an optimizer for use in the advanced control block 38.

Likewise, an operator viewing routine 49 may be provided in one of the workstations 13 to enable an operator to interface with the advanced control block 38 to view the current operation of the advanced control block 38, to change parameters such as tuning parameters associated with the advanced control block 38 and to take other actions as necessary with respect to the advanced control block 38. As described in more detail below, the advanced control block 38 may include or implement a two-stage model predictive control technique to implement control within the process plant.

Generally speaking, model predictive control (MPC) is a class of control algorithms that computes a sequence of control variables (process inputs) which are used to control a process to optimize the future behavior of the process, based on an objective function which defines optimal process behavior. When implementing MPC, an MPC controller solves, at a current time k, an optimization problem over a finite prediction horizon ($H_p$) with respect to a predetermined objective function, such that the predicted output variables (which are the process variables being controlled) can optimally stay close to a set of reference trajectories or set points. Usually, the objective function is selected as a quadratic function and the control horizon ($H_c$) is smaller than the prediction horizon ($H_P$). In order to incorporate feedback information about the true system output, the computed control sequence is only implemented until the next measurement instant (i.e., time k+1), at which point the entire MPC computation is repeated. The nature of this computation procedure allows control input and process output constraints be taken into account in a systematic manner in the optimization process.

Without the loss of generality, state space representations for an arbitrary plant or process will be used herein to describe a new multi-stage MPC controller. Generally, it will be assumed that a multi-input and multi-output linear plant is described by the following state space equations $$x(k+1)=Ax(k)+Bu(k) \quad (1a)$$

$$y(k)=Cx(k) \quad (1b)$$

where x is the state variable vector, u is the control input vector, and y is the process output vector (associated with the controlled variables). As a result, $x(k) \in R^n$, $u(k) \in R^m$, $y(k) \in R^p$, and A, B, and C are matrices with appropriate dimensions. Following usual definitions, the weighted 2-norm on a positive definite matrix P is defined as $\|x\|_p = \sqrt{x^T P x}$.

The measured state variable at a time k is denoted as $x(k|k)=x(k)$, and the estimated state variable at time k is $\hat{x}(k|k)$. The prediction horizon and the control horizon are represented by $H_p$ and $H_c$ respectively. Thus, the predicted state and control variables at a time k+i based on x(k) (or $\hat{x}(k|k)$) are denoted by $x^p(k+i|k)$ and $u^p(k+i-1|k)$ respectively (for i=1, 2, ... $H_p$).

With this background, a typical MPC control technique used to control a plant with state estimation can be described by the following computational procedure.

Step 1: Obtain the initial conditions for state variables at current time k. This step is usually accomplished using the state estimation equation, taking real-time measurements y(k) into account, and can be described as:

$$\hat{x}(k|k)=(A-K_e CA)\cdot \hat{x}(k-1|k-1)+(B-K_e CB)\cdot u(k-1)+K_e y(k) \quad (2)$$

where $K_e$ is the pre-calculated state estimator gain.

Step 2: Set $x^p(k|k)=x(k)$ and solve the following optimization at each sampling time k for (k=1, 2, ... ):

$$\min_{u^p(k|k),\ldots,u^p(k+H_p-1|k)} \sum_{i=1}^{H_p} \left\{ \begin{array}{l} \|y^p(k+i+1|k)-y_{set}+ \\ y^p_d(k+i+1|k)+ \\ err(k)\|_Q^2 + \|\Delta u^p(k+i|k)\|_R^2 \end{array} \right\} \quad (3)$$

Subject to:

$err(k)=y(k)-y^p(k|k)$ $x^p(k+i+1|k)=Ax^p(k+i|k)+Bu^p(k+i|k)$ (State equation constraints)

$y^p(k+i|k)=Cx^p(k+i|k)$ (Output equation constraints)

$u^p(k+H_c+j|k)=u^p(k+H_c|k)$ (j=1, 2, ... $H_p$-$H_c$)

$|u^p(k+i|k)| \leq U_{max}$ (Control input constraints)

$|y^p(k+i|k)| \leq Y_{max}$ (Process output constraints)

for (i=0, 1, ... $H_p$)

Step 3: Apply the control signals $u(k)=u^p(k|k)$ to the process and repeat the computation process from Step 1.

Note that, generally speaking, solving, Equation (3) finds the set of predicted control inputs $u^P$ over the prediction horizon $H_p$ (i.e., from the current time k to the prediction horizon time k+$H_p$-1) that minimizes the summation of the terms on the right side of Equation (3). In general, the summation expression of Equation (3) includes two factors which, when minimized together, define the optimal set of control signals $u^P$. In particular, the objective function factors of Equation (3) include the sum of the squared error between the predicted value of the process outputs $y^P$ and their respective set points $y_{set}$ and the change in the predicted control signal ($\Delta u^P$) from the last time instant. Thus, the effect of the objective function of Equation (3) is to reduce the error between the process outputs $y^P$ and their desired set points $y_{set}$ while minimizing changes in the control signal u during controller operation over the prediction horizon.

It will also be noted that the set of control signals $u^P$ is determined in Equation (3) in a manner that does not violate any of the state equation constraints, the output equation constraints, the control input constraints or the process output constraints as defined above (immediately following Equation (3)), and assumes that the control signal $u^P$ has reached steady state (i.e., does not change) at or after the control horizon ($H_c$). It will be noted that the first term after the summation in Equation (3) takes into account changes in the process output due to disturbance variables (the $y^P_d$ term) and compensates for the error between a previous prediction of the current process output and the actual measured output at the current time (i.e., the err(k) term of Equation (3)). Still further, the Q and R matrices, which are positive definite matrices, are weighting factors on process output and control input, respectively, and $U_{max}$ and $Y_{max}$ are constraints on control input and process output, respectively. Usually, input constraints are hard-constraints because they represent physical limitations of equipment (for example, an actuator), while process output constraints are soft-constraints because they represent performance in terms of process deviations. As a result, process output constraints can usually be relaxed if the on-line optimization encounters feasibility problems. Sometimes, a stability constraint is also imposed to guarantee nominal closed-loop stability. Typically, nominal closed-loop stability is achieved by adjusting the length of prediction and control horizons in combination with the tuning provided by the weighting matrices Q and R.

Additionally, in the above described standard MPC formulation, process output predictions resulting from measured disturbances and a disturbance model are explicitly incorporated into the objective function, although this feature is not always necessary. Disturbance response prediction can be computed as:

$$x_d(k+1) = A_d x_d(k) + B_d v(k)$$

$$y_d(k) = C_d x_d(k)$$

where $(A_d, B_d, C_d)$ represent the disturbance model, $x_d$ and $y_d$ are corresponding disturbance state and output deviation variables, and v is the measured disturbance.

From the above discussion, it can be seen that that what is traditionally referred to as feedforward and feedback control is implemented using the single objective function of Equation (3) during MPC controller operation. Thus, while the matrixes Q and R can be changed, to tune the MPC controller, doing so tunes both the traditional feedforward control operation and the traditional feedback control operation simultaneously, and to the same extent. It is difficult if not impossible, using traditional MPC techniques such as those described above, to tune feedforward control response and feedback control response separately or individually.

A new, two-stage MPC controller, which provides separately operating and tunable feedforward and feedback control components using an MPC technique will now be described. Generally, the two-stage MPC controller operation or technique includes two MPC control blocks, each having a separate objective function, with one of the MPC control blocks being used to implement feedforward control and the other one of the MPC control blocks being used to implement feedback control. The outputs of these two MPC control blocks are then combined to produce the final outputs of the MPC controller which are delivered to the process and process control inputs. Because feedfoward and feedback control operations are separated in this two-stage technique, feedforward and feedback control can be separately or individually implemented and tuned, as is possible in traditional control techniques, like PID control.

Figure 2:
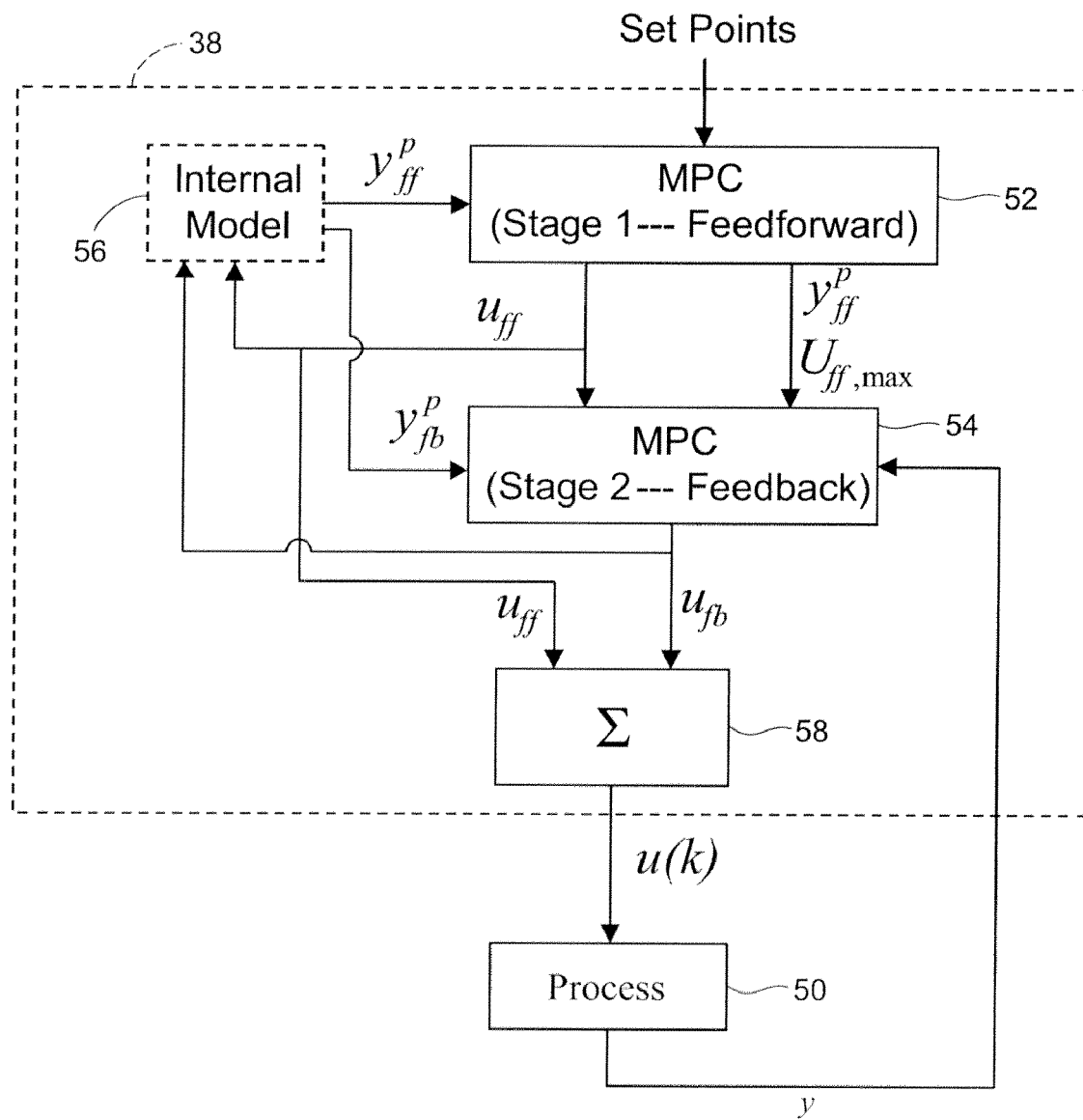
FIG. 2 is a block diagram of the advanced controller function block of FIG. 1 implemented as a two-stage MPC controller.

FIG. 2 illustrates a block diagram of one embodiment of a two-stage MPC controller which may be implemented as the advanced control block 38 of FIG. 1, and which is communicatively coupled to a process 50. As will be understood, the advanced control block 38 of FIG. 2 produces a set of manipulated variables MV signals (or control signals) that are provided to other function blocks which, in turn, are connected to control inputs of the process 50 to control the operation of the process 50. As illustrated in FIG. 2, the two-stage MPC controller 38 includes a first MPC control block 52, a second MPC control block 54, a process model 56 and a summer unit 58. The process model 56 may be, for example, a step response model, an impulse response model, a first principles model, a parameterized model, or any other desired type of process model typically associated with or used in an MPC controller or with an MPC control technique. The MPC control blocks 52 and 54 may implement any desired type of MPC routines or procedures and may receive, as inputs, a set of control variables (CV) and auxiliary variables (AV) as measured within the process 50, a set of disturbance variables (DV) which represent known or expected changes or disturbances to the process 50 at some time in the future, and a set of steady state target control and auxiliary variables CV and AV which are provided to the controller 38 as set points. Additionally, input, output, and other constraints may be provided to or stored in the control block 38. The MPC control block 38 uses these inputs to create the set of manipulated variables MV (in the form of control signals) and delivers the manipulated variable signals MV to control the process 50.

The two-stage MPC technique implemented by the control block 38 of FIG. 2 can be described by the following computational procedure, which is generally divided into two stages. The first stage, implemented by the MPC block 52, computes a set of feedforward control signals $u_{ff}$, a set of predicted process output signals $y^P_{ff}$ as a result of the feedforward control signals and a set of feed forward control signal constraints $U_{ff,max}$ and provides these signals to the MPC control block 54, which implements the second stage of the MPC technique. Generally speaking, the second stage of the MPC technique determines a set of feedback control signals $u_{fb}$, which implement feedback control. As a result, the control block 52 will be referred to herein as a feedfoward MPC control block and the control block 54 will be referred to herein as a feedback MPC control block. The summer block 58 sums the feedforward control signals $u_{ff}$ with the feedback control signals $u_{fb}$ to produce the final control signals u provided to the process 50.

One example of the two-stage operation of the MPC block 38 of FIG. 2 will be described below. In a first stage, associated with feedforward control, the following steps are performed by, for example, the feedforward MPC control block 52 of FIG. 2.

Step 1: Obtain the initial conditions for the state variable $x^P(k|k)$ upon start-up, and calculate initial state variables at each subsequent step. This model-based prediction calculation may be performed using state equations (1a) and (1b) given above.

Step 2: Solve the following optimization (objective function) at each sampling time k (k=1, 2, . . . ):

$$\min_{u^P_{ff}(k|k),\ldots,u^P_{ff}(k+H_p-1|k)} \sum_{i=1}^{H_p} \left\{ \begin{array}{l} \|y^P_{ff}(k+i+1|k) - y_{set} + \\ y^P_d(k+i+1|k)\|^2_Q + \| \\ \Delta u^P_{ff}(k+i|k)\|^2_{R_{ff}} \end{array} \right\} \quad (4)$$

Subject to:

$$x^P(k+i+1|k) = Ax^P(k+i|k) + Bu^P_{ff}(k+i|k)$$

$$y^P_{ff}(k+i|k) = Cx^P(k+i|k)$$

$$u^P_{ff}(k+H_d j|k) = u^P_{ff}(k+H_c|k) \ (j=1, 2, \ldots H_p - H_c)$$

$$|u^P_{ff}(k+i|k)| \leq U_{ff,max} \text{ (with } U_{ff,max} \leq U_{max})$$

$$|y^P_{ff}(k+i|k)| \leq Y_{max}$$

For $(i=0, 1, \ldots H_p)$

Step 3: Store the feedforward control signal(s) $u_{ff}(k)=u_{ff}^P(k|k)$, and go to the second stage.

In the above procedure, $R_{ff}$ is the weighting matrix applied to the feedforward control inputs, $u_{ff}^P(k+i|k)$ is the computed feedforward control signal, $y_{ff}^P(k+i|k)$ is the resulting process output prediction, and $U_{ff,max}$ is the portion of control input constraints designated for feedforward control, which can be adjusted if desired. As will be seen, the feedforward MPC control block 52 implements Equation (4) to determine the set of feedforward control signals $u^P_{ff}$ that minimizes the objective function of Equation (4). The objective function of Equation (4) is similar to that of Equation (3), but has some significant differences. First of all, because Equation (4) implements feed forward control, it does not include the error term err(k), which performs feedback compensation (error correction). Likewise, the control signals $u^P_{ff}$ are constrained by a term $U_{ff,max}$ which is typically less than the control constraint $U_{max}$ associated with Equation (3).

As indicated in FIG. 2, the feedforward MPC control block 52 solves Equation (4) using the internal model 56 and, more particularly, selects a set of $u^P_{ff}$ signals over the control horizon and provides these signals to the internal model 56 which provides a set of predicted process output signals $y^P_{ff}$ (based on the control signals $u^P_{ff}$) which are then used to compute the summation value on the right side of Equation (4). The set of predicted control signals $u^P_{ff}$ is then altered and this process is repeated to find the set of predicted control signals $u^P_{ff}$ which minimizes the summation of Equation (4) subject to the associated constraints. When a minimum is found, the set of predicted control signals $u^P_{ff}$ which results in this minimum is provided to the summer 58 of FIG. 2 (e.g., by being stored in a manner accessible by the summer 58.

In a second stage, associated with feedback control, the following steps are performed by, for example, the feedback MPC control block 54 of FIG. 2.

Step 1: Obtain feedback initial condition for state variables at the current step. This operation can usually be performed through the state estimation equations, taking real-time measurement y(k) into account. This can be mathematically expressed as:

$$\hat{x}(k|k)=(A-K_e CA)\cdot\hat{x}(k-1|k-1)+(B-K_e CB)\cdot u(k-1)+K_e(y(k)-y_{ff}^P(k|k)) \quad (5)$$

where $K_e$ is the pre-calculated state estimator gain.

Step 2: Set $x^P(k|k)=\hat{x}(k|k)$ and solve the following optimization (objective function) at each sampling: time k (k=1, 2, ...)

$$\min_{u_{fb}^P(k|k),\ldots,u_{fb}^P(k+H_p-1|k)} \sum_{i=1}^{H_p} \left\{ \begin{array}{l} \|y_{fb}^P(k+i+1) + \\ err(k)\|_Q^2 + \|\Delta u_{fb}^P(k+i|k)\|_{R_{fb}}^2 \end{array} \right\} \quad (6)$$

Subject to:

$x^P(k+i+1|k)=Ax^P(k+i|k)+Bu_{fb}^P(k+i|k)$ $y_{fb}^P(k+i|k)=Cx^P(k+i|k)$ $err(k)=y(k)-y_{ff}^P(k|k)-y_{fb}^P(k|k)$ $u_{fb}^P(k+H_c+j|k)=u_{fb}^P(k+H_c|k) \; (j=1, 2, \ldots H_p-H_c)$ $|u_{fb}^P(k+i|k)|\leq U_{fb,max}(k+i|k)$ $|y_{fb}^P(k+i|k)|\leq Y_{max}-y_{ff}^P(k+i|k)$ For $(i=0, 1, \ldots H_p)$ In the above procedure, $R_{fb}$ is the weighting matrix on feedback control input, $u_{fb}^P(k+i|k)$ defines the computed feedback control signals, $y_{fb}^P(k+i|k)$ is the resulting process output predictions, and $U_{fb,max}(k+i|k)$ is the portion of control input constraints designated for feedback. For simplicity, the weighting on output error is selected as Q, which is the same matrix selected for feedforward control in the first stage. However, different Q weighting matrices may be selected for the feedforward and feedback control calculations of Equations (4) and (6) if desired to allow an additional degree of tuning for these separate calculations.

As will be understood, the feedback MPC control block 54 implements the objective function of Equation (6) using the process model 56 to determine the set of feedback control signals $u^P_{fb}$. The objective function of Equation (6) is similar to that of Equation (3), but with some important differences. First of all, because Equation (6) implements feedback control, it does not take measured disturbance or set point values into account, but does include the error term err(k), which performs feedback error correction. As a result, the first term of the summation of Equation (6) attempts to drive the process output variable signals $y^P_{fb}$ to zero, which means that this term is ultimately driving the final process output variable $y^P$ which, equals $y^P_{ff}+y^P_{fb}$ to be that determined by the feedforward MPC control block 52 (i.e., $y^P_{ff}$). Likewise, the control signals $u^P_{fb}$ are constrained by a term $U_{fb,max}$ which is less than $U_{max}$ associated with Equation (3).

As indicated in FIG. 2, the block 54 solves Equation (6) using the internal model 56 and, more particularly, selects a set of feedback control signals $u^P_{fb}$ over the control horizon and provides these signals to the internal model 56 which produces a set of predicted process output signals $y^P_{fb}$ based on the process control inputs $u^P_{fb}$. The predicted process output signals $y^P_{fb}$ are then used by the feedback MPC control block 54 to compute the summation value on the right side of Equation (6). The set of predicted feedback control signals $u^P_{fb}$ is then altered, and this process is repeated to find the set of predicted feedback control signals $u^P_{fb}$ which minimizes the summation of Equation (6) subject to the associated constraints. When a minimum is found, the set of predicted feedback control signals $u^P_{fb}$ which results in this minimum is provided to the summer 58 of FIG. 2 (e.g., by being stored in a manner accessible by the summer 58.)

The summer unit 58 of FIG. 2 applies the final step of the second stage, which is to compute the output control signal u(k) as a sum of the predicted feedforward control signal $u^P_{ff}$ and the feedback control signal $u^P_{fb}$. This summation may be expressed as:

$u(k)=u_{ff}^P(k|k)+u_{fb}^P(k|k)$

As illustrated in FIG. 2, the output control signal u(k) is then provided to the process 50 as a control input. Thereafter, during the next controller execution cycle, the above-described, two-stage MPC technique is repeated.

Importantly, the control constraints $U_{fb,max}$ for feedback control used by the feedback MPC control block 54 can be determined in a number of manners, including in either of the following two ways:

$U_{fb,max}(k+i|k)=U_{max}-U_{ff,max}$ or $U_{fb,max}(k+i|k)=U_{max}-u_{ff}^P(k+i|k)$ In the first instance, the total constraint on each of the control signals $U_{max}$ is divided in a predetermined manner between the feedforward MPC control block 52 and the feedback MPC control block 54, so that the feedforward block 52 can use up to $U_{ff,max}$ (which is less than or equal to $U_{max}$) during any particular execution cycle of the controller and the feedback block 54 can use the remaining preset amount of the total constraint which is the difference between $U_{max}$ and $U_{ff,max}$. Here both the feedforward and the feedback control constraints are fixed during each execution cycle. If desired, the feedback control constraint could be preset (such as by a user) and the feedforward control constraint could be determined as the difference between the maximum control constraint and the feedback control constraint.

In the second feedback constraint equation provided above, the feedback control constraint $U_{fb,max}$ is dynamic, in the sense that it can change during each execution cycle depending on the amount of the control constraint $U_{max}$ actually used by the feedforward block 52 during that execution cycle. In this case, the feedback control constraint for any particular time up to the control horizon is the difference between the maximum control constraint $U_{max}$ and the feedforward control signal computed for that time $u^P_{ff}(k+1|k)$. This second constraint calculation technique allows the entire control constraint to be utilized, even if the feed forward control signal does not use the entire amount of the control constraint allotted to the feedforward control component (i.e., $U_{ff,max}$).

As will be noted in the equations provided above, the two-stage MPC technique also applies constraints on the process outputs $y^P$ to keep each process output $y^P$ less than or equal to a maximum constraint value $Y_{max}$ (which may be defined separately for each individual process output). As can be seen, the feedforward MPC control block 52 keeps each process output below the respective maximum constraint and the feedback MPC control block 54 is allowed to use any unused portion of that constraint during operation based on the actual value of the feedforward control component $y^P_{ff}$. Of course, if desired, the process output constraints for $y^P_{ff}$ and $y^P_{fb}$ could be preset as a certain fixed portions of the maximum constraint value $Y_{max}$, if so desired.

The above described, two-stage MPC technique thus explicitly separates the calculations performed for determining the feedforward and feedback control components of the resulting control signal produced by the MPC controller. This feature, in turn, allows the feedforward and feedback control components to be tuned separately through weighting matrices $R_{ff}$ and $R_{fb}$ (and $Q_{ff}$ and $Q_{fb}$ if desired). In particular, a user can specify or modify the weighting matrices $R_{ff}$ and $R_{fb}$ to tune the feedforward and feedback control modules separately (and differently if desired), to provide more weight or emphasis to one or the other of the feedforward and feedback components of the final control signal. Likewise, this technique explicitly divides control input constraints between the feedforward and the feedback components to allow the user to specify the relative contributions to the control operation made by the feedforward control and feedback control modules 52 and 54. Thus, for example, using this two-stage technique, control action can be made aggressive through feedforward control, while feedback action can be lowered for trimming purposes.

An example of an implementation of the above-described two-stage MPC technique will now be described to illustrate the basic operation of the two-stage MPC controller 38. In this case, a nominal plant will be assumed to be described by the following transfer function model:

$$G(s) = \frac{1}{20s + 1}$$

Thus, in this case, the process model 56 of FIG. 2 may be implemented as a parameterized or first principles model that uses this transfer function, or may use a step or impulse responses generated according to this transfer function. However, due to process variation, the following transfer function will be assumed to represents the true process:

$$\tilde{G}(s) = \frac{1.05}{200s^2 + 30s + 1}$$

For the sake of this computational example, both of these transfer functions were discretized at a sampling time of $T_s=2$ seconds and converted to discrete-time state-space format. The control objective is to initially control the process output to reach a set point=1 within 20 samples (40 seconds) without causing more than 20 percent overshoot in this variable. The final response should settle down to within 3 percent of steady-state in 60 samples. To focus on the key idea, the measured disturbances and the disturbance model were not included in the simulation, and moreover, the process output constraint was not incorporated into the simulation. Thus, no constraints were implemented on the process output variable, allowing that variable to take any value during the control horizon. For easy comparison, the weighting parameter Q was selected to be the same (the identity matrix) in all cases, and the control horizon and the prediction horizon were selected as $H_c=20$ and $H_p=100$ consistently. The control input constraint was selected as $U_{max}=4$ throughout the simulation.

Figure 3:
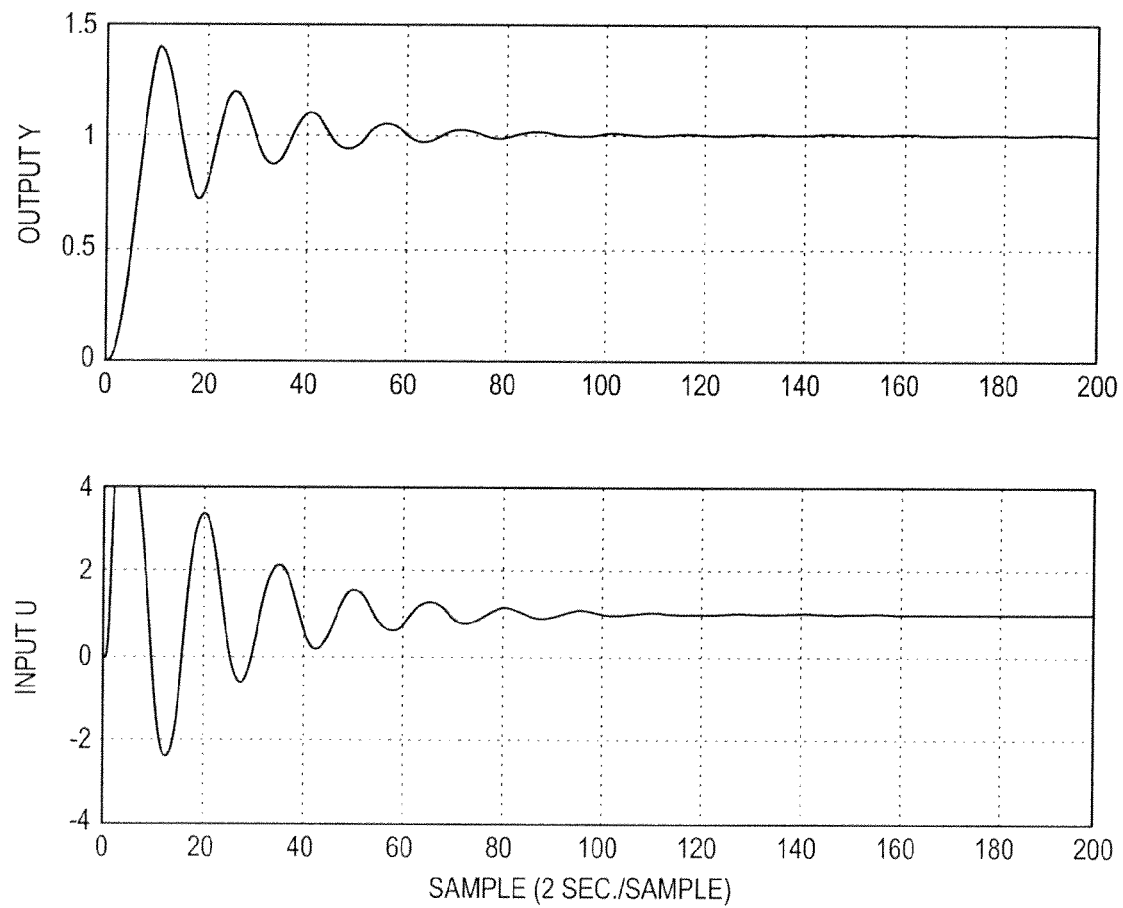
FIG. 3 is a graph illustrating an example operation of a conventional MPC control module in which a tuning parameter is set to 0.001.
Figure 4:
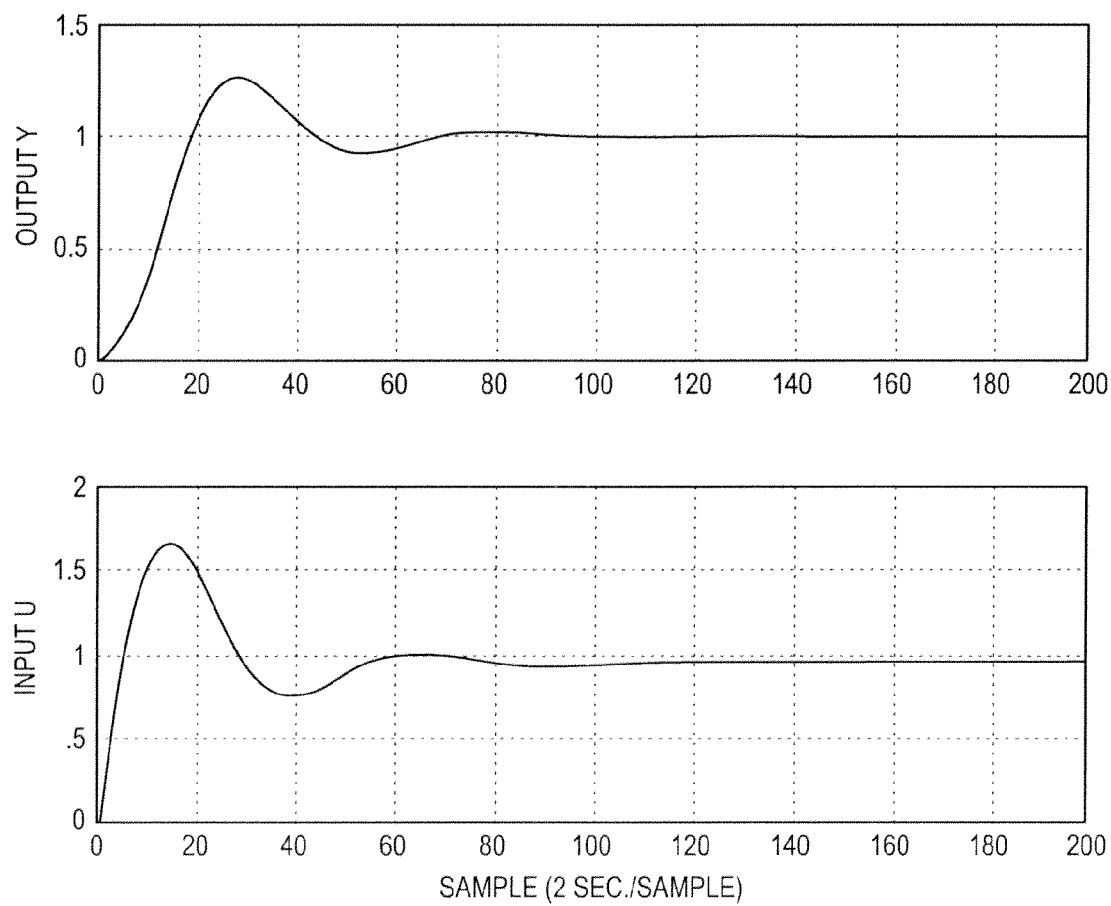
FIG. 4 is a graph illustrating an example operation of a conventional MPC control module in which a tuning parameter is set to 10.
Figure 5:
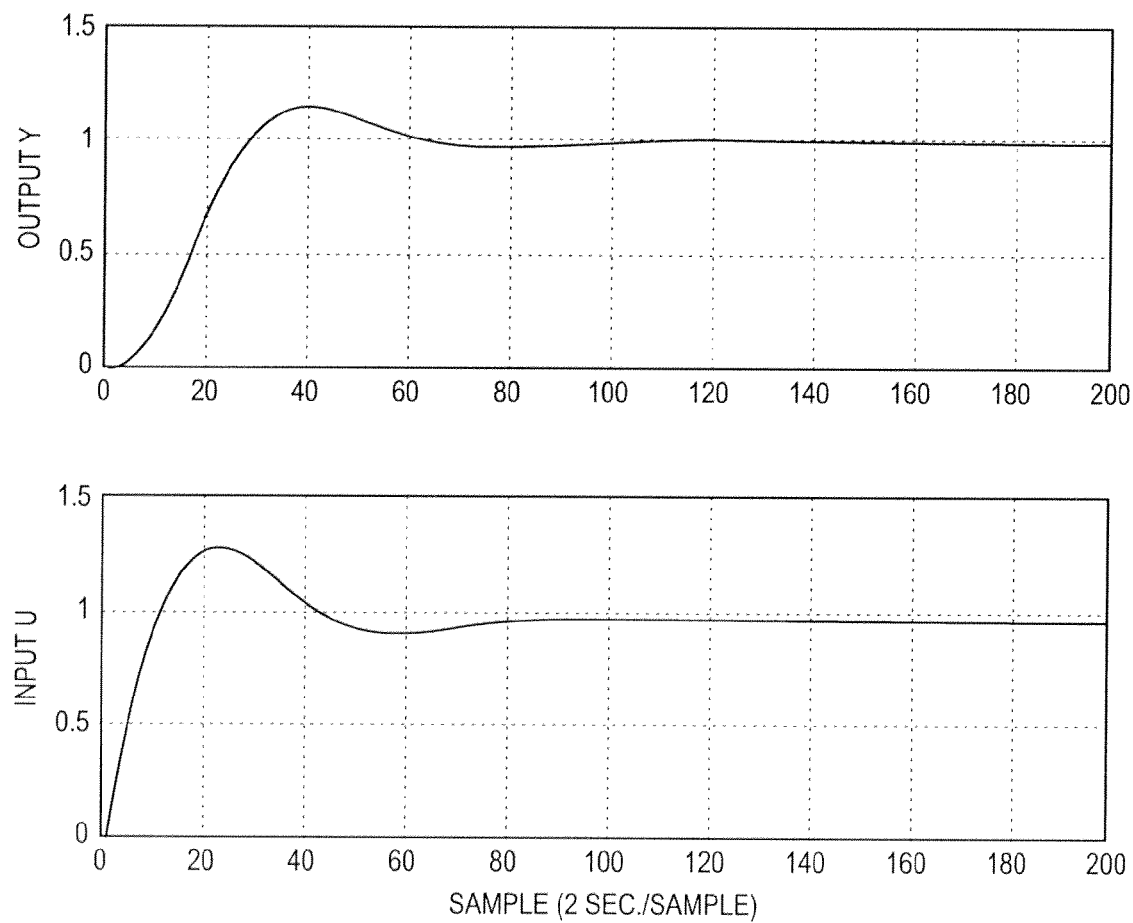
FIG. 5 is a graph illustrating an example operation of a conventional MPC control module in which a tuning parameter is set to 50.
Figure 6:
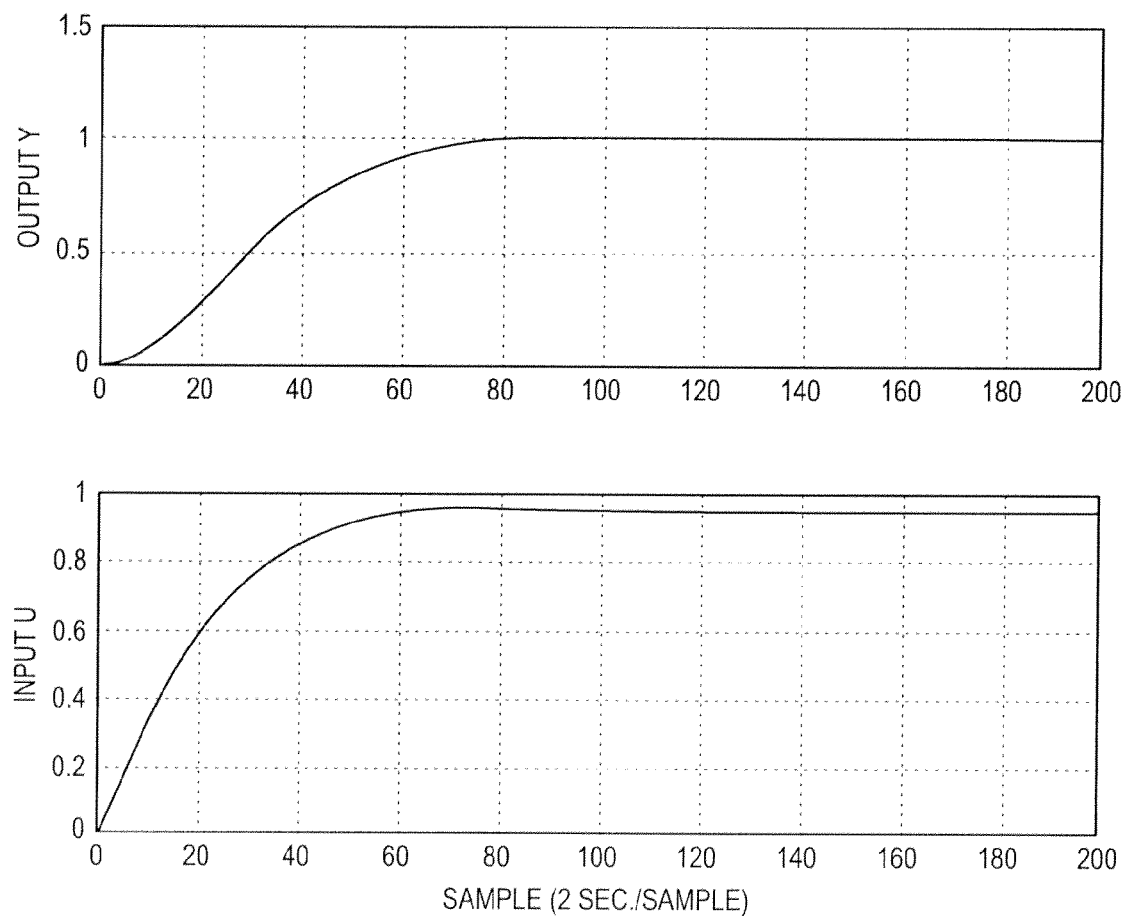
FIG. 6 is a graph illustrating an example operation of a conventional MPC control module in which a tuning parameter is set to 1000.

To illustrate the operation of the two control modules 52 and 54 of FIG. 2, the outputs of these modules when using the above described computational example are compared with outputs of a conventional single-stage MPC controller using FIGS. 3-7. In particular, the signal produced by a conventional MPC (equation 3) is illustrated in FIGS. 3-6 for various different values of a single tuning parameter R. As illustrated in FIGS. 3-6, as the tuning parameter R increases from 0.001 to 1000, the MPC control output performance goes from fast and oscillatory to slow and smooth. In general, it is difficult to find a good compromising tuning parameter R that satisfies all of the performance measures stated above. More particularly, FIG. 3 illustrates the process output y and the control input u when the tuning parameter R=0.001. As can be seen in FIG. 3, the response is fast but results in large overshoot and oscillatory operation. FIG. 4 illustrates the process output y and the control input u when the tuning parameter R=10. As can be seen in FIG. 4, the process response is generally fast enough, but still results in unacceptably large overshoots and very oscillatory performance. FIG. 5 illustrates the process output y and the control input u when the tuning parameter R=50. As can be seen in FIG. 5, the process response includes small overshoot and is not quite as oscillatory as the lower values of R, but now results in a slow response time. Finally, FIG. 6 illustrates the process output y and the control input u when the tuning parameter R=1000. As can be seen in FIG. 6, the process response includes no overshoot and is very smooth, but has an unacceptably slow response time for most uses.

Figure 7:
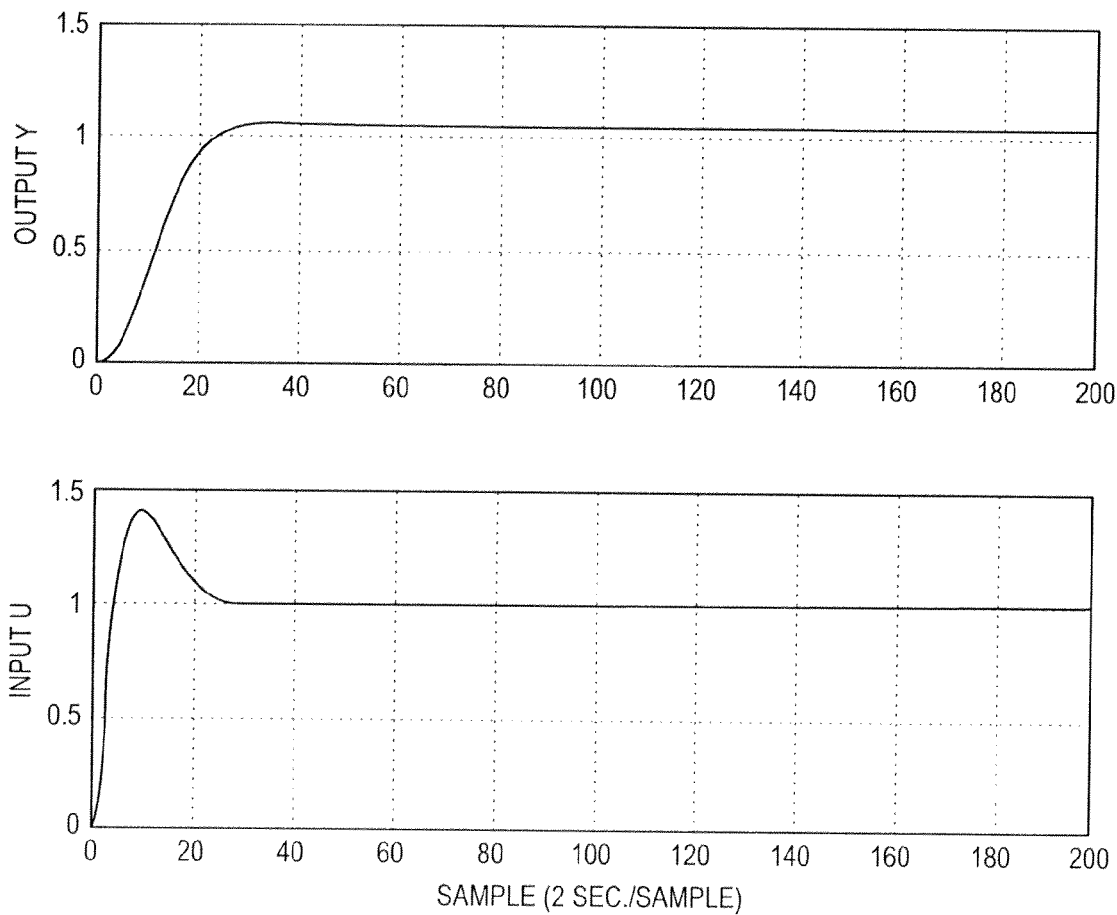
FIG. 7 is a graph illustrating an example operation of a feedforward MPC control module of the two-stage MPC controller of FIG. 2 in which a feedforward tuning parameter is set to 5.

FIG. 7 illustrates the process output $y_{ff}$ and the feedforward control input $u_{ff}$ resulting from a feedforward tuning parameter $R_{ff}=5$ used in the two-stage MPC technique described in FIG. 2. Here, typical feedforward control response is seen with fast response time and small overshoot, but with steady stead error due to process-model mismatch. Thus, for the selection of $R_f=5$, in this case, the dynamic performance is good in general, but the final response has a steady-state error.

Figure 8:
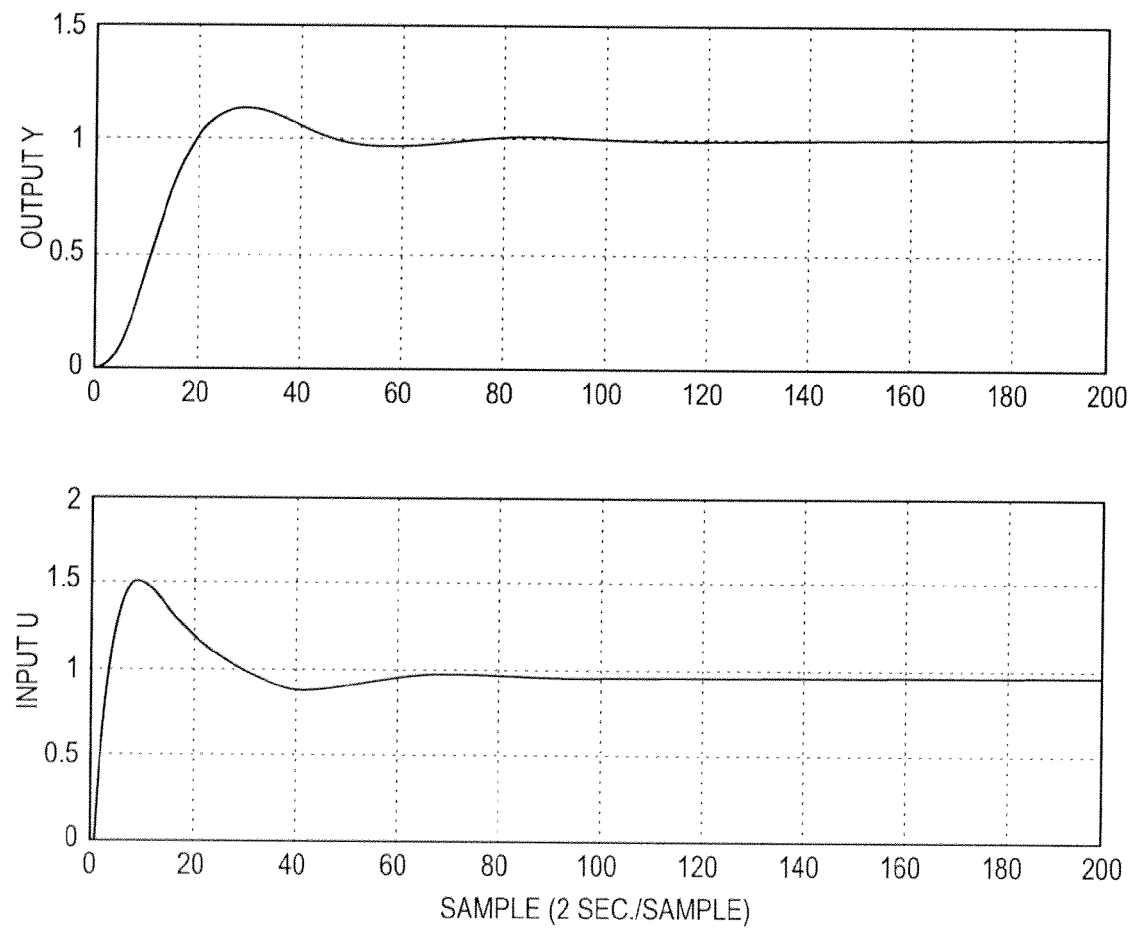
FIG. 8 is a graph illustrating a control signal and a process variable response for a plant resulting from combined use of the feedforward and feedback control modules of the two-stage MPC controller of FIG. 2.
Figure 9:
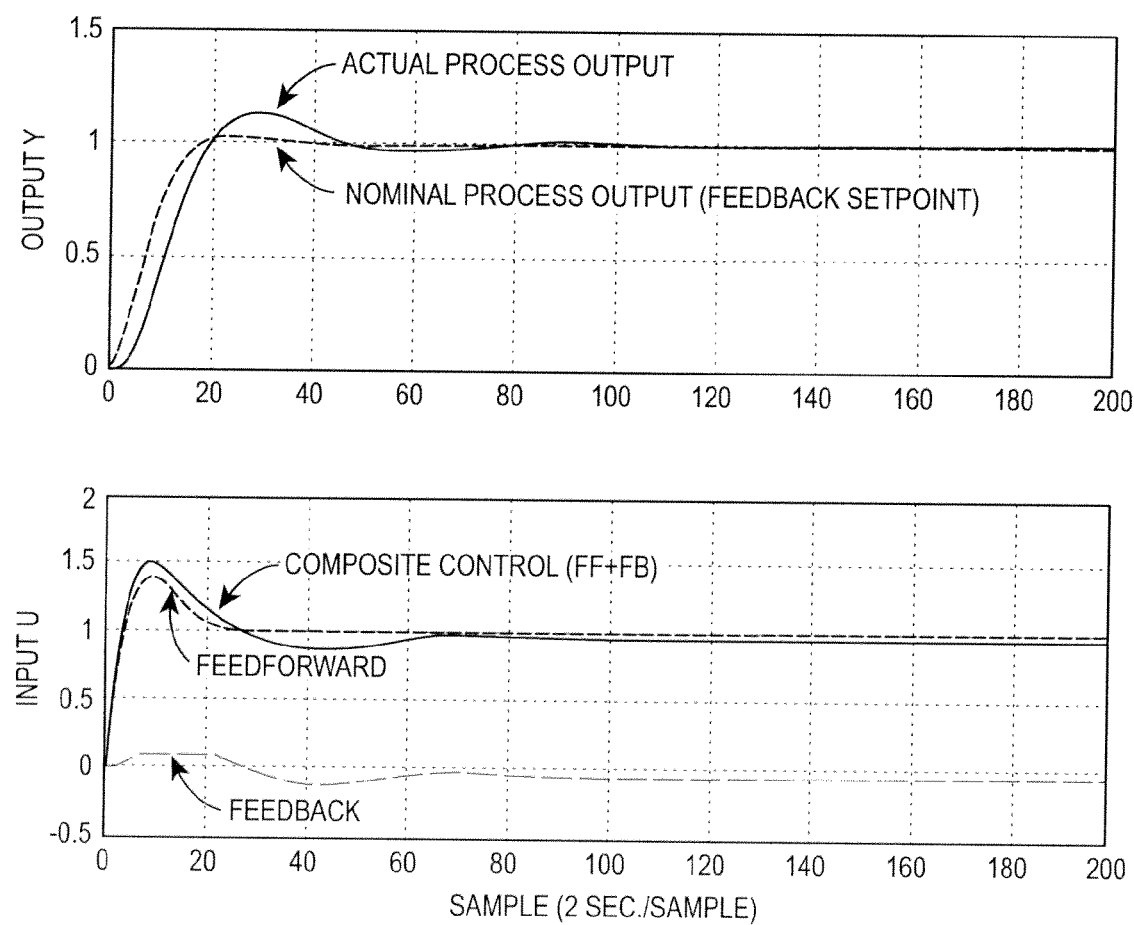
FIG. 9 is a graph illustrating more details with respect to the control signal and process variable response depicted in FIG. 8.

FIG. 8 illustrates the process output y and the control input u resulting from the combination of the feedforward and feedback control signals generated by the two-stage MPC technique described above when the tuning parameters $R_f=5$ and $R_{fb}=20$. Here, overall satisfactory performance is obtained. In this case, the control input constraint on the feedforward module is chosen as 3.9 and the control input constraint on the feedback module is chosen as 0.1 to scale the relative operation of the feedforward control and the feedback control. As can be seen in FIG. 8, all of the above identified control performance measures are satisfied. FIG. 9 illustrates the manner in which the feedforward and feedback control signals contribute to the overall control signal, and the nominal feedback performance on the process output for the system used in FIG. 8.

As can be seen, the two-stage MPC technique described above uses two different objective functions to separately compute a feedforward component of a control signal and a feedback component of the control signal and then adds these signals together to create a control signal for each of a set of process control inputs. Here, it is preferable that the feedforward control component is computed first and is used to compute the feedback control component. As noted above, the objective function used to determine the feedforward control component may take into consideration and account for process variable set points, disturbance variable changes and inputs while minimizing control variable movement, while the objective function used to determine the feedback control component may take into consideration and account for process variable feedback measurements while minimizing control variable movement. However, while particular quadratic programming (QP) is described herein for use in the feedforward and feedback MPC control blocks 52 and 54 of FIG. 2, other types of objective functions and constraints could be used as well or instead, including non-linear objective functions with linear constraints, quadratic objective functions with quadratic constraints, linear objective functions with non-linear constraints, etc.

Of course, the blocks 52 and 54 could use any known or standard QP solving algorithms or techniques, and could be used with process optimization, in which an optimizer iterates to determine the set of target manipulated or set point process variables which maximize or minimize an optimization criteria, such as another objective function.

During operation, one or more monitoring applications run in, for example, one of the interfaces 13 of FIG. 1 may subscribe to information from the advanced control block 38 or other function blocks communicatively connected thereto, either directly or through the historian 12, and provide one or more viewing or diagnostics screens to the user or operator for viewing the operational state of the advanced control block 38. Function block technology features cascade inputs (CAS_IN) and remote cascade inputs (RCAS_IN) as well as corresponding back calculation outputs (BKCAL_OUT and RCAS_OUT) oil both control and output function blocks. It is possible, using these connectors, to attach a supervisory optimized MPC control strategy on top of the existing control strategy and this supervised control strategy may be viewed using one or more viewing screens or displays. Likewise, targets for the optimized MPC controller can be modified from a strategy as well, if so desired. Still further, these screens may enable a user or operator to change tuning parameters (e.g., the Q and R parameters of Equations (4) and (6)), process variable set points, constraints such as state equation constraints, output equation constraints, process output constraints, etc. Additionally, the user or operator may be able to alter the manner in which the control input constraint $U_{max}$ is allocated between the feedforward MPC control block 52 and the feedback MPC control block 54 of FIG. 2.

While the two-stage MPC controller function block 38 has been illustrated herein as having the MPC control blocks 52 and 54, the model 56 and the summer 58 located within the same function block and therefore executed in the same controller device, it is also possible to implement these control blocks in separate devices. In particular, the various blocks of FIG. 2 may be located in different devices and may communicate with one another over a network during each execution or scan of the controller to calculate and provide the new control signals to the process. Of course, a special interface, such as a known OPC interface, may be used to provide the communication interface between the controller or the function block having the MPC controller therein and the workstation or other computer that implements or executes the optimizer.

While the advanced control block 38 and other blocks and routines described herein have been described herein as being used in conjunction with Fieldbus and standard 4-20 ma devices, they can, of course, be implemented using any other process control communication protocol or programming environment and may be used with any other types of devices, function blocks or controllers. Although the advanced control blocks and the associated generation and testing routines described herein are preferably implemented in software, they may be implemented in hardware, firmware, etc., and may be executed by any other processor associated with a process control system. Thus, the routines described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:
1. A method of controlling a set of process variables within a process, the method comprising:
storing a set of process variable set points for the process variables;
storing a process model for the process;
receiving a set of measured process variable values for the process variables;
implementing a multiple-input/multiple-output control procedure using the set of process variable set points and the set of measured process variable values to develop a control signal for use in controlling the process, including;
  using a first objective function and the stored process model to develop a feedforward control component, the first objective function using the set of process variable set points;
  using a second objective function and the stored process model to develop a feedback control component, the second objective function using the set of measured process variable values; and
  combining the feedforward control component and the feedback control component to produce the control signal; and
using the control signal to control the set of process variables.

2. The method of controlling a set of process variables of claim 1, wherein implementing the multiple-input/multiple-output control procedure includes using a first model predictive control procedure incorporating the first objective function to produce the feedforward control component and includes using a second model predictive control procedure incorporating the second objective function to produce the feedback control component.

3. The method of controlling a set of process variables of claim 1, wherein using the first objective function and the stored process model to develop the feedforward control component includes using the process model to determine a set of feedforward control signals which minimizes the first objective function and wherein using the second objective function and the stored process model to develop the feedback control component includes using the process model to determine a set of feedback control signals which minimizes the second objective function.

4. The method of controlling a set of process variables of claim 3, wherein the first objective function is different than the second objective function.

5. The method of controlling a set of process variables of claim 3, wherein using the first objective function and the stored process model to develop the feedforward control component includes using, as the first objective function, a function which determines a difference between a predicted value of one of the process variables and one of the process variable set points.

6. The method of controlling a set of process variables of claim 3, wherein using the first objective function and the stored process model to develop the feedforward control component includes using, as the first objective function, a function which determines a difference between a predicted value of one of the process variables as determined by the process model and one of the process variable set points taking into account a predicted change in the one of the process variables based on a disturbance variable.

7. The method of controlling a set of process variables of claim 3, wherein using the first objective function and the stored process model to develop the feedforward control component includes using, as the first objective function, a function which determines a difference between a predicted value of one of the process variables and one of the process variable set points and which determines a change in a control signal used to generate the predicted value of the one of the process variables between two instances of time.

8. The method of controlling a set of process variables of claim 3, wherein using the first objective function and the stored process model to develop the feedforward control component includes using, as the first objective function, a function which determines a sum of the squared differences between a set of predicted values of the set of process variables and a set of set points for the set of process variables at different instances in time, and which computes a sum of squared changes in a control signal between at least some of the different instances in time.

9. The method of controlling a set of process variables of claim 3, wherein using the second objective function and the stored process model to develop the feedback control component includes using, as the second objective function, a function which determines an error between one of the measured process variable values and a predicted value of the process variable.

10. The method of controlling a set of process variables of claim 3, wherein using the second objective function and the stored process model to develop the feedback control component includes using, as the second objective function, a function which determines an error between a predicted value of one of the process variables and one of the measured values of the process variable and which determines a change in a control signal between two instances of time.

11. The method of controlling a set of process variables of claim 3, wherein using the second objective function and the stored process model to develop the feedback control component includes using, as the second objective function, a function which determines a sum of squared predicted process variable values compensated by a difference between a predicted value of one of the process variables and one of the measured process variable values at numerous instances in time, and which determines a sum of squared changes in a determined control signal between at least some of the numerous instances in time.

12. The method of controlling a set of process variables of claim 1, wherein combining the feedforward control component and the feedback control component includes adding the feedforward control component to the feedback control component to produce the control signal.

13. The method of controlling a set of process variables of claim 1, wherein using the first objective function and the stored process model to develop the feedforward control component includes using a first feedforward tuning parameter within the first objective function, and wherein using the second objective function and the stored process model to develop the feedback control component includes using a second feedback tuning parameter within the second objective function.

14. The method of controlling a set of process variables of claim 1, wherein one of the first objective function and the second objective function includes a tuning parameter and including enabling a user to alter the tuning parameter of the one of the first objective function or the second objective function without altering the other of the first objective function or the second objective function.

15. The method of controlling a set of process variables of claim 1, wherein the first objective function and the second objective function each includes a separately changeable tuning parameter and either allowing the tuning parameter of the first objective function to be changed separately from changing the tuning parameter of the second objective function or allowing the tuning parameter of the second objective function to be changed separately from changing the tuning parameter of the first objective function.

16. The method of controlling a set of process variables of claim 1, including solving the first objective function and the second objective functions subject to a maximum control signal constraint, including solving the first objective function using a first control signal constraint that is less than the maximum control signal constraint and solving the second objective function using a second control signal constraint that is less than the maximum control signal constraint, wherein the sum of the first control signal constraint and the second control signal constraint is less than or equal to the maximum control signal constraint.

17. The method of controlling a set of process variables of claim 16, including setting the first control signal constraint to a preset value less than the maximum control signal constraint and setting the second control signal constraint to be a difference between the maximum control signal constraint and the first control signal constraint.

18. The method of controlling a set of process variables of claim 16, including setting the first control signal constraint to a preset value less than or equal to the maximum control signal constraint and setting the second control signal constraint to be a difference between the maximum control signal constraint and the feedforward control component.

19. The method of controlling a set of process variables of claim 1, including solving the first objective function and the second objective functions subject to a maximum process output signal constraint, including solving the first objective function using a first process output signal constraint that is less than the maximum process output signal constraint and solving the second objective function using a second process output signal constraint that is less than the maximum process output signal constraint, wherein the sum of the first process output signal constraint and the second process output signal constraint is less than or equal to the maximum process output signal constraint.

20. A control system for implementation on a computer processor for use in controlling at least a portion of a process, comprising:
 a computer readable medium;
 a storage routine stored on the computer readable medium and executable on a processor to store a process model and one or more process variable set points for a set of process variables;
 a feedforward control routine stored on the computer readable medium and executable on a processor to produce a feedforward control signal using the process model, the feedforward control routine including a first objective function that develops the feedforward control signal based on a difference between predicted values for the set of process variables and the one or more process variable set points;
 a feedback control routine stored on the computer readable medium and executable on a processor to produce a feedback control signal using the process model, the feedback control routine including a second objective function that develops the feedback control signal based on one or more measured values of the set of process variables; and
 a combiner stored on the computer readable medium and executable on a processor to combine at least of portion of the feedforward control signal and at least a portion of the feedback control signal to produce an output control signal to be used to control the set of process variables.

21. The control system of claim 20, wherein storage routine stores the process model as one of a step-response model, a first principles model or a parameterized model.

22. The control system of claim 20, wherein the feedforward control routine implements a model predictive control procedure using the first objective function and the feedback control routine implements a model predictive control procedure using the second objective function.

23. The control system of claim 20, wherein the feedforward control routine uses the process model to determine a set of values for the feedforward control signal over time which minimizes the first objective function and wherein the feedback control routine uses the process model to determine a set of values for the feedback control signal over time which minimizes the second objective function.

24. The control system of claim 23, wherein the first objective function includes a difference between a first predicted value of one of the process variables and one of the process variable set points and the second objective function includes an error between a measured value of the one of the process variables and a second predicted value of the one of the process variables.

25. The control system of claim 24, wherein the first objective function includes a predicted change in the one of the process variables based on a disturbance variable.

26. The control system of claim 20, wherein the first objective function determines a difference between a first predicted value of one of the process variables and one of the process variable set points and determines a change in a control signal used to generate the first predicted value of the one of the process variables between two instances of time, and wherein the second objective function determines an error between a second predicted value of the one of the process variables and a measured value of the one of the process variables and determines a change in a control signal used to generate the second predicted value of the one of the process variables between two instances of time.

27. The control system of claim 20, wherein the combiner sums a component of the feedforward control signal with a component of the feedback control signal to produce the output control signal.

28. The control system of claim 20, wherein the feedforward control signal includes a feedforward control signal value for each of a set of time instances in the future and wherein the feedback control signal includes a feedback control signal value for each of the set of time instances in the future.

29. The control system of claim 20, wherein the first objective function includes a feedforward tuning parameter and the second objective function includes a feedback tuning parameter and wherein the feedforward tuning parameter is separately changeable from the feedback tuning parameter.

30. The control system of claim 20, wherein one of the first objective function or the second objective function includes a user-changeable tuning parameter.

31. The control system of claim 30, further including an interface routine that enables a user to change the user-changeable tuning parameter.

32. The control system of claim 20, wherein the feedforward control routine solves the first objective function subject to a feedforward control signal constraint, the feedback control routine solves the second objective function subject to a feedback control signal constraint, and wherein the sum of the feedforward control signal constraint and the feedback control signal constraint is less than or equal to a preset maximum control signal constraint.

33. The control system of claim 32, wherein one of the feedforward control signal constraint and the feedback control signal constraint is a preset value less than the maximum control signal constraint and the other of the feedforward control signal constraint and the feedback control signal constraint is a difference between the maximum control signal constraint and the one of the feedforward control signal constraint and the feedback control signal constraint.

34. The control system of claim 32, wherein the feedforward control signal constraint is a preset value less than or equal to the maximum control signal constraint and the feedback control signal constraint is a difference between the maximum control signal constraint and some portion of the feedforward control signal.

35. The control system of claim 32, wherein the feedforward control routine further solves the first objective function subject to a feedforward process output signal constraint, the feedback control routine solves the second objective function subject to a feedback process output signal constraint, and wherein the sum of the feedforward process output signal constraint and the feedback process output signal constraint is less than or equal to a preset maximum process output signal constraint.

36. A process controller for controlling a process, comprising:
- a process model that produces predicted process variable values based on one or more control inputs to the process;
- a first control block, including a first objective function, that determines a first control signal using the process model and the first objective function, the first objective function computing a difference between a first predicted process variable value for the process variable determined according to the process model and a first process variable set point for the process variable;
- a second control block, including a second objective function, that determines a second control signal using the process model and the second objective function, the second objective function computing a difference between a second predicted process variable value of the process variable and a measured value of the process variable; and
- a combiner which combines at least a portion of the first control signal with a least a portion of the second control signal to produce an output control signal used to control the process variable of the process.

37. The process controller of claim 36, wherein the first objective function computes a difference between a set of first predicted process variable values for the process variable determined according to the process model and a set of process variable set points for the process variable, wherein the set of first predicted process variable values includes a predicted process variable value for each of a plurality of instances in time and wherein the second objective function uses a set of second predicted process variable values of the process variable, wherein the set of second predicted process variable values includes a predicted process variable value for each of the plurality of instances in time.

38. The process controller of claim 37, wherein the first objective function includes a first tuning parameter and the second objective function includes a second tuning parameter which is separately changeable from the first tuning parameter.

39. The process controller of claim 36, wherein the first control block uses the first objective function and the process model to develop a set of time values for the first control signal which minimizes the first objective function and wherein the second control block uses the second objective function and the process model to develop a set of time values for the second control signal which minimizes the second objective function and wherein the combiner combines at least one of the set of time values for the first control signal and at least one of the set of time values for the second control signal to produce the output control signal.

40. The process controller of claim 36, wherein one of the first objective function and the second objective function includes a user-changeable tuning parameter.

41. The process controller of claim 36, wherein the first control block solves the first objective function subject to a first control signal constraint, the second control block solves the second objective function subject to a second control signal constraint, and wherein the sum of the first control signal constraint and the second control signal constraint is less than or equal to a predetermined maximum control signal constraint.

42. The process controller of claim 41, wherein one of the first control signal constraint and the second control signal constraint is a preset value less than the maximum control signal constraint and the other of the first control signal constraint and the second control signal constraint is determined as a difference between the maximum control signal constraint and the one of the first control signal constraint and the second control signal constraint.

43. The process controller of claim 41, wherein the first control signal constraint is a preset value less than or equal to the maximum control signal constraint and the second control signal constraint is a difference between the maximum control signal constraint and some portion of the first control signal.

44. The process controller of claim 41, wherein the first control block further solves the first objective function subject to a first process output signal constraint, the second control block solves the second objective function subject to a second process output signal constraint, and wherein the sum of the first process output signal constraint and the second process output signal constraint is less than or equal to a predetermined maximum process output signal constraint.

45. The process controller of claim 36, wherein the first control block further solves the first objective function subject to a first process output signal constraint, the second control block solves the second objective function subject to a second process output signal constraint, and wherein the sum of the first process output signal constraint and the second process output signal constraint is less than or equal to a predetermined maximum process output signal constraint.

* * * * *